(12) United States Patent
Zhou et al.

(10) Patent No.: US 6,768,823 B2
(45) Date of Patent: Jul. 27, 2004

(54) OPTICAL ISOLATOR

(75) Inventors: Mingbao Zhou, Shenzhen (CN); River Yang, Shenzhen (CN); Qing Liu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/269,153

(22) Filed: Oct. 10, 2002

(65) Prior Publication Data

US 2003/0138183 A1 Jul. 24, 2003

(30) Foreign Application Priority Data

Jan. 18, 2002 (TW) ..................................... 91200440 U

(51) Int. Cl.[7] ............................. G02B 6/27; G02B 27/28
(52) U.S. Cl. ............................................ 385/11; 359/483
(58) Field of Search .......................... 385/11, 15, 27, 385/34, 73, 74, 93, 61

(56) References Cited

U.S. PATENT DOCUMENTS

| | | | | |
|---|---|---|---|---|
| 5,317,655 A | * | 5/1994 | Pan .............................. | 385/11 |
| 5,611,009 A | * | 3/1997 | Pan .............................. | 385/22 |
| 5,642,447 A | * | 6/1997 | Pan et al. ...................... | 385/31 |
| 5,815,614 A | * | 9/1998 | Pan .............................. | 385/22 |
| 6,181,850 B1 | * | 1/2001 | Nakamura et al. ............ | 385/33 |
| 6,488,414 B1 | * | 12/2002 | Dawes et al. ................. | 385/79 |
| 6,556,733 B2 | * | 4/2003 | Dy et al. ....................... | 385/11 |

* cited by examiner

*Primary Examiner*—John D. Lee
*Assistant Examiner*—Jennifer Doan
(74) *Attorney, Agent, or Firm*—Wei Te Chung

(57) ABSTRACT

An optical isolator (100) includes an input port (10), an output port (20), an optical isolating means (30) and a mounting tube (40). The input port includes an optical fiber (13) having an exposed end, a ferrule (12) defining a through hole 121 for holding the optical fiber, a molded lens (11), a sleeve (14) and a metal holder (15). The molded lens collimates optical signals transmitted from the optical fiber. The output port is constructed like the input port. The optical isolating means is disposed in an optical path between the input port and the output port. The optical isolating means transmits optical signals in an input direction and blocks reflected optical signals in the reverse direction. The mounting tube accommodates and fixes the input and output ports and the optical isolating means.

14 Claims, 4 Drawing Sheets

OPTICAL ISOLATOR

BACKGROUND OF THE INVENTION

1. Field of the Invention

The present invention is related to optical isolators for use in optical fiber communication and optical network technology, and more particularly to optical isolators which employ molded lenses.

2. Description of the Prior Art

In the field of optical fiber communications, problems with the performance of optical devices often arise. One such problem is caused by light reflecting off an end face or another part of an optical device. Such reflections can return to the light source, adversely affecting the light source and deteriorating the quality of communications. Another problem is caused by echoes of transmitted optical signals, which are caused by multiple reflections off the end face or another part of an optical device. The deterioration in performance of a light source due to the return of reflected light has been previously observed in connection with the stability of self-mode locking. Now, devices designed to eliminate reflected lights such as optical isolators, are used in optical fiber communication systems to prevent such deteriorated performance and eliminate reflected light.

FIG. 5 shown a conventional optical isolator as disclosed in U.S. Pat. No. 5,557,692. The optical isolator 80 comprises an input port 81, an output port 82 and an isolating means 83. The input port 81 comprises an input optical fiber 811 and a first Graded Index (GRIN) lens 812. The output port 82 comprises an output optical fiber 821 and a second GRIN lens 822. The isolating means 83 includes a first polarizer 831, a second polarizer 832 and a liquid crystal cell 833 disposed in the path of the rays from the first polarizer 831 to the second polarizer 832.

The conventional optical isolator 80 using GRIN lenses 812, 822 as collimating elements has some disadvantages. Firstly, the GRIN lenses are made using the ion-exchange method. However, this method requires a long time and further steps of polishing after initial formation, so it is difficult and expensive to manufacture. Secondly, some chemicals used in the ion-exchange method contaminate the environment and endanger the fabrication workers.

The present invention overcomes the above-described disadvantages of conventional optical isolators by offering an optical isolator having molded lenses which yield higher performance at a lower cost. A copending application Ser. No. 10/172,232 with the same assignee and the same inventors as the present invention discloses similar technology applied to other types of optical components.

SUMMARY OF THE INVENTION

Accordingly, an object of the present invention is to provide an improved optical isolator which employs molded lenses as collimating elements.

Another object of the present invention is to provide an optical isolator having high precision lenses which are relatively environmentally friendly to produce.

A further object of the present invention is to provide an optical isolator which is easily and cheaply manufactured.

To solve the problems of the prior art and to achieve the objects set forth above, an optical isolator of the present invention comprises an input port, an isolating means, an output port and a mounting tube. The input port comprises a ferrule having an optical fiber, a molded lens, a sleeve and a metal holder. The optical fiber has an exposed end and the ferrule defines a through hole for receiving and fixing the optical fiber therein. The ferrule has a rearward face and a forward face. The forward face of the ferrule is ground at an oblique angle and is flush with the exposed end of the optical fiber. The molded lens is cylindrical in shape and has an oblique surface coinciding with that of the ferrule and the exposed end of the optical fiber. A gap is defined between the molded lens and the ferrule. The output port is similar to the input port. The isolating means includes a first polarizer, a second polarizer and a Faraday rotator disposed in the paths of the rays from the first polarizer to the second polarizer. Furthermore, the optical axis of the second polarizer is oriented 45 degrees with respect to the optical axis of the first polarizer. The isolating means is located in the path of light beams from the input port to the output port.

Since the present invention employs molded lenses as the collimating elements, the cost and environmental problems associated with GRIN lenses are mitigated and efficiency is improved.

Other objects, advantages and novel features of the present invention will be apparent from the following detailed description of the preferred embodiment thereof with reference to the attached drawings, in which:

DESCRIPTION OF THE PREFERRED EMBODIMENT

Figure 1:
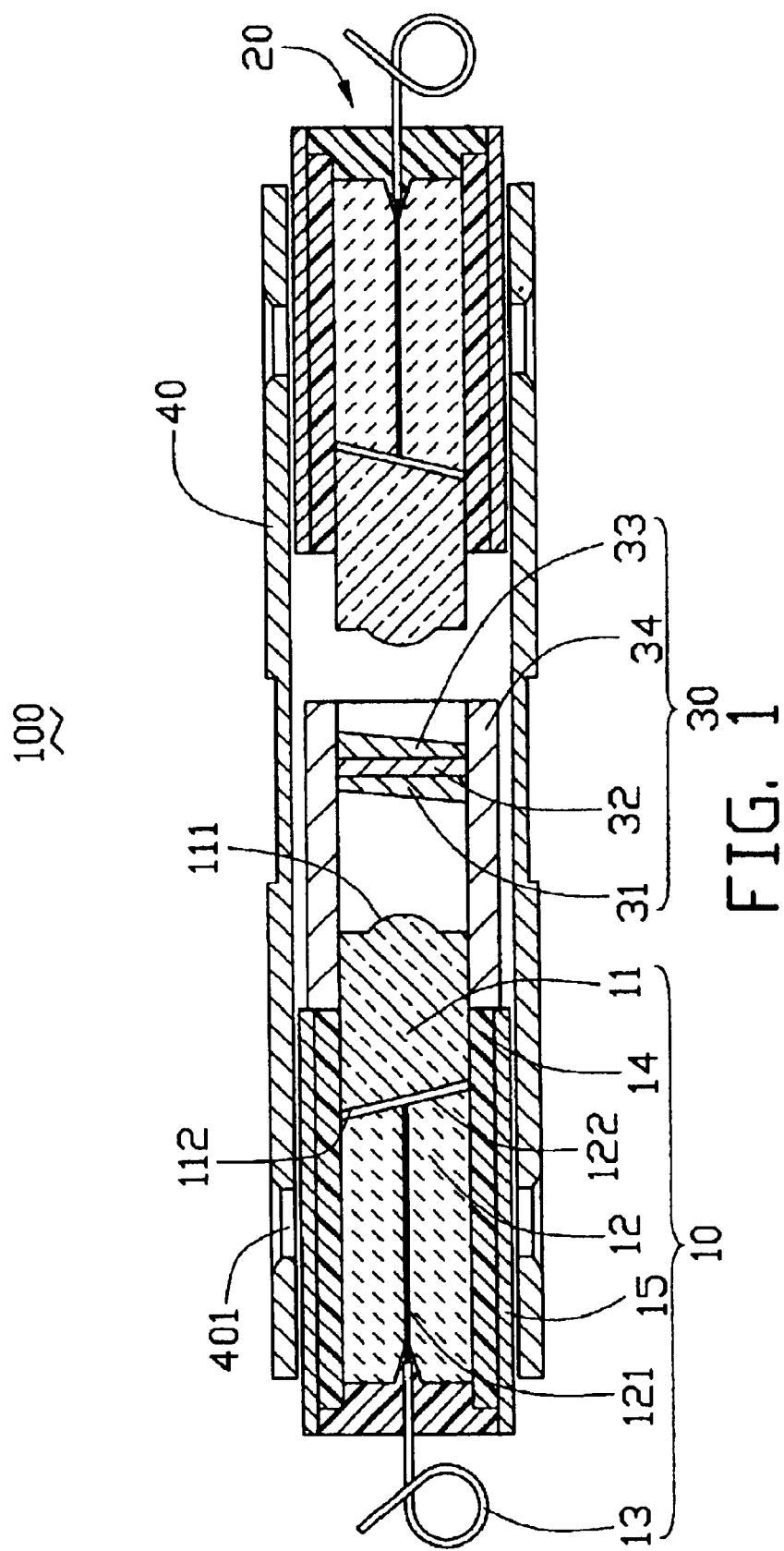
FIG. 1 is a cross-sectional diagram of an optical isolator according to the present invention.

For facilitating understanding, like components are designated by like reference numerals throughout the preferred embodiment of the invention as shown in the various drawing figures.

Reference will now be made to the drawings to describe the present invention in detail.

Referring to FIG. 1, an optical isolator 100 in accordance with a preferred embodiment of the present invention comprises an input port 10, an isolating means 30, an output port 20 and a mounting tube 40.

Figure 2:
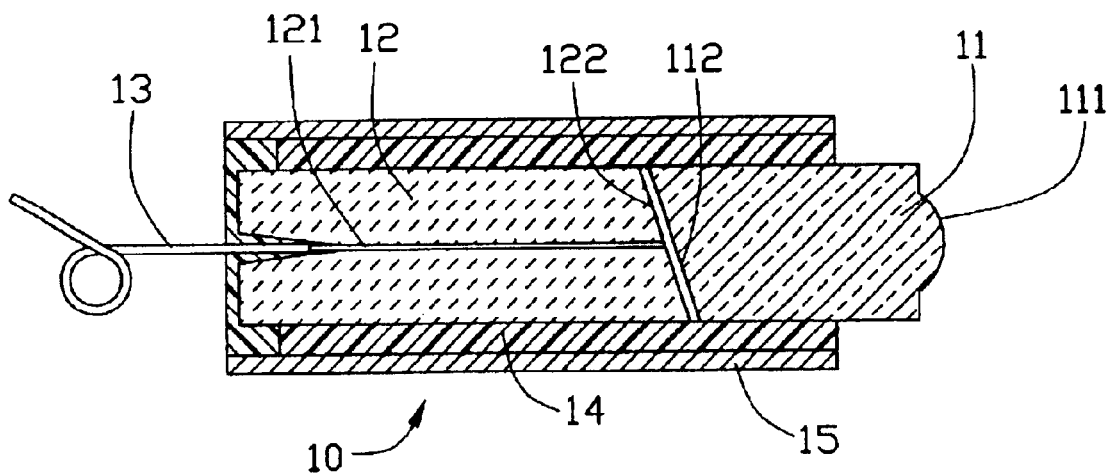
FIG. 2 is a cross-sectional view of an input port of the optical isolator of FIG. 1.

The input port 10 and the output port 20 are identical in construction. The input port 10 is described as an example. As shown in FIG. 2, the input port 10 comprises a molded lens 11, a ferrule 12, an optical fiber 13, a sleeve 14 and a metal holder 15.

The ferrule 12 is cylindrical in shape and is made of a ceramic, a metal or a plastic material. The ferrule 12 has a forward face 122, a rearward face (not labeled) and a through hole 121 defined between the forward face 122 and the rearward face (not labeled). A diameter of the through hole 121 is slightly greater than a diameter of the optical fiber 13. A conical opening (not labeled) coaxial with the through hole 121 is defined in the rearward face (not labeled). The optical fiber 13 with has an exposed end is preferably fixed in the through hole 121 with UV-cured epoxy or 353-ND epoxy. To improve optical performance, the forward face 122 of the ferrule 12 and the exposed end (not labeled) of the optical fiber 13 are ground and polished at an oblique angle relative to an imaginary plane constructed perpendicular to a longitudinal axes of the ferrule 12. The angle is preferably between 6 and 8 degrees.

Figure 3:
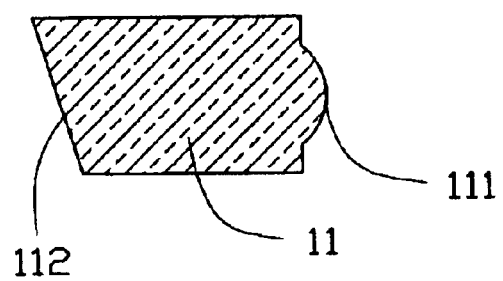
FIG. 3 is a cross-sectional view of a molded lens of the optical collimator of FIG. 2.

Referring to FIG. 3, the molded lens 11 is substantially cylindrical and has a uniform refractive index. A rearward face 112 of the molded lens 11 forms an oblique angle with an imaginary plane constructed perpendicular to a longitudinal axis of the molded lens 11. The angle is preferably between 6 and 8 degrees and should be equal to the angle of the forward face 122 of the ferrule 12. A forward face 111 of the molded lens 11 has an aspherical surface. The rearward face 112 and the forward face 111 are both coated with an antireflective coating to reduce reflection losses.

The molded lens 11 may be made entirely using conventional methods such as injection molding. Therefore the molded lens can be formed with a high quality surface and high surface accuracy, and requires no further preparatory operations, such as grinding or polishing. Time required to make the molded lens is short and the cost is low. Furthermore, the antireflective coatings applied to the two end faces of the molded lens do not influence the optical path of transmitted light beams since the molded lens has a uniform refractive index. Finally, the fabrication process does not contaminate the environment or endanger the fabrication workers.

The sleeve 14 receives the molded lens 11 and the ferrule 12 therein. The metal holder 15 covers on outer surface of the sleeve 14 to protect the input port 10.

In assembly, the exposed end of the optical fiber 13 is coated with epoxy and is threaded through the conical opening and into the through hole 121 of the ferrule 12. The ferrule 12 with the attached optical fiber 13 then have a corresponding end thereof ground to a same oblique angle as that of the molded lens 11. The molded lens 11 and the ferrule 12 with the attached optical fiber 13 are arranged in the receiving cavity of the sleeve 14 so that the forward face 122 of the ferrule 12 is parallel to and separated from the rearward face 112 of the molded lens 11 by a narrow gap defined between the molded lens 11 and the ferrule 12. This arrangement is designed to assure precise collimation of light beams coming from the optical fiber 13. The metal holder 15 is attached to the sleeve 14 with epoxy.

Figure 4:
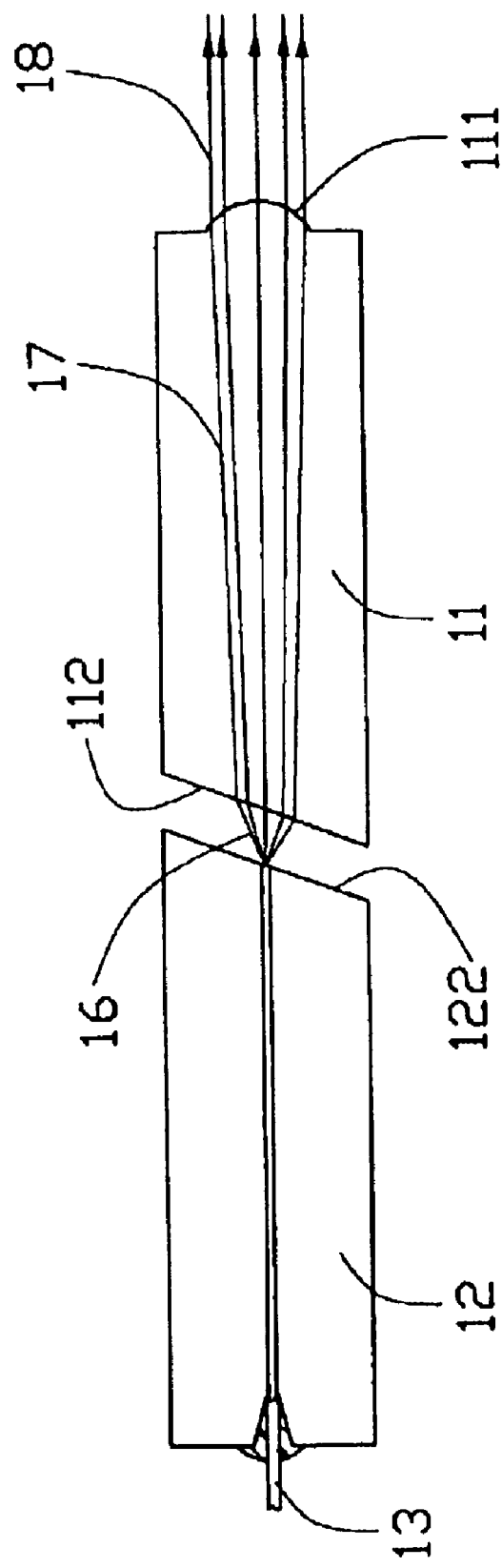
FIG. 4 is an essential optical paths diagram of the input port of FIG. 2.
Figure 5:
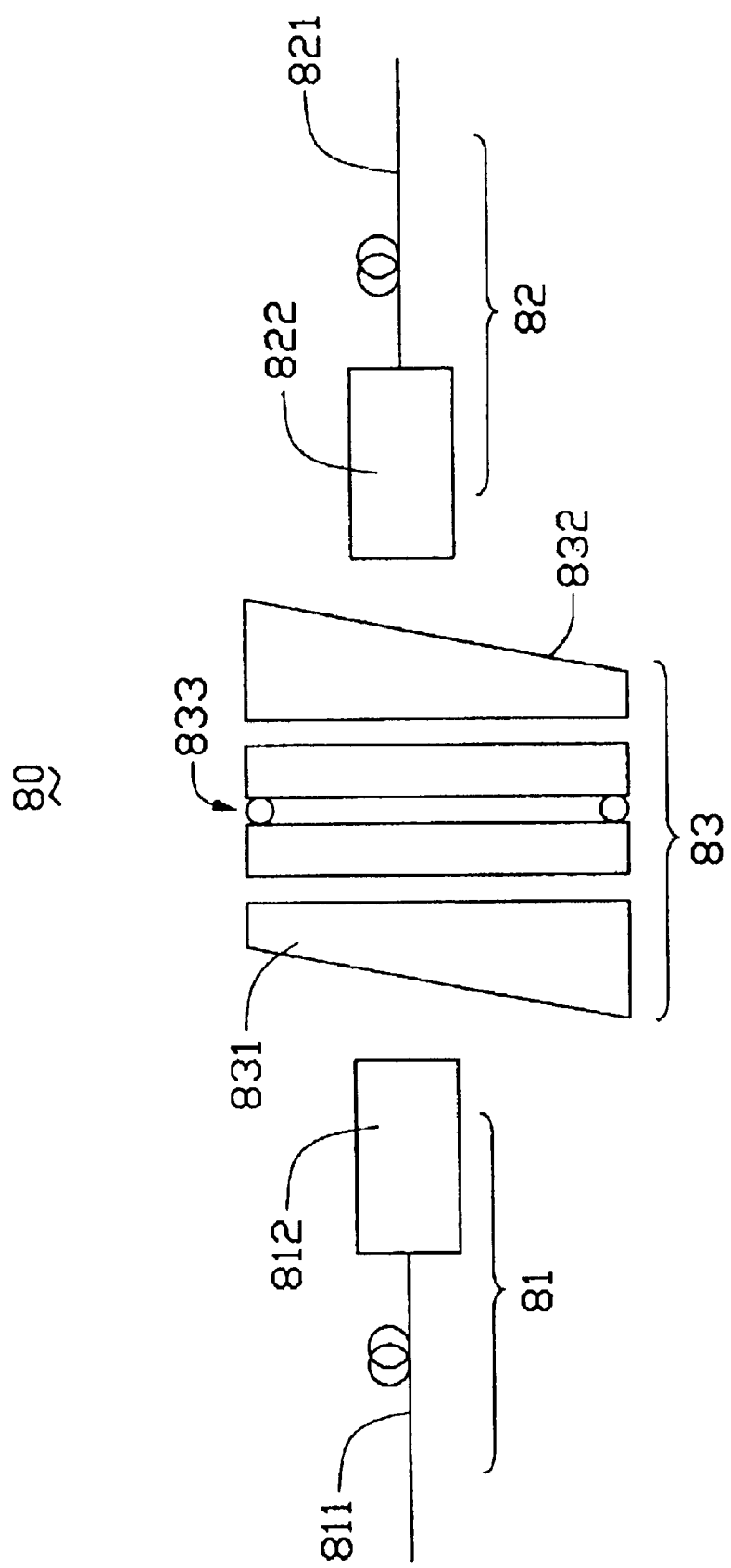
FIG. 5 is a schematic view of a conventional optical isolator.

As shown in FIG. 4, in the present invention, a focal point of the molded lens 11 is located at the point where the through hole 121 intersects with the forward face 122 of the ferrule 12. Scattered light beams 16 emitted from the optical fiber 13 are refracted at the rearward face 112 of the molded lens 11, then the light beams 17 are refracted again at the forward face 111 of the molded lens 11 to emerge as parallel light beams 18 from the molded lens 11. The collimating process of the light beams in the input port 10 is accomplished.

Since optical paths are reversible in lenses, light beams from the isolating means 30 directed at a front end of the output port 20 and parallel to a longitudinal axis of the output molded lens (not labeled) can be focused to the exposed end of the output optical fiber (not labeled) at forward face of the output ferrule (not labeled) by the output molded lens (not labeled).

As shown in FIG. 1, the isolating means 30 comprises a first polarizer 31, a Faraday rotator 32, a second polarizer 33, and a housing 34. The first and second polarizers 31, 33 are typically made of birefringent crystals, or may be another type of polarizer. The optical axis of the second polarizer 33 is oriented 45 degrees with respect to the optical axis of the first polarizer 31. The Faraday rotator 32 is disposed in the paths of the light beams from the first polarizer 31 to the second polarizer 33. The housing 34 holds the polarizers 31, 33 and the Faraday rotator 32 together to achieve the isolating function.

In operation, the isolating means 30 is located in the path of light beams from the input port 10 to the output port 20. In the forward direction, the first polarizer 31 of the isolating means 30 separates the incident light from the input port 10 into a first ray, which is polarized along the crystal's optical axis and which is called an extraordinary ray, and into a second ray, which is polarized in a direction perpendicular to the crystal's optical axis and which is called an ordinary ray. The light from the first polarizer 31 is then rotated by the Faraday rotator 32, which rotates the polarized light by 45 degrees. The rotated light is then recombined by the second polarizer 33 and is then output from the output port 20.

In the reverse direction, light from the output port 20 is separated by the second polarizer 33 into a first ray, which is polarized along the crystal's optical axis and which is called an extraordinary ray, and into a second ray, which is polarized in a direction perpendicular to the crystal's optical axis and which is called an ordinary ray. When passing back through the Faraday rotator 32, the light in both rays is rotated 45 degrees. This rotation is nonreciprocal with the rotation of light in the forward direction, so that the ordinary ray from the second polarizer 33 is polarized along the optical axis of the first polarizer 31 and the extraordinary ray from the second polarizer 33 is polarized in a direction perpendicular to the optical axis of the first polarizer 31. The ordinary and extraordinary rays from the second polarizer 33 have swapped places incident upon the first polarizer 31, because of this exchange, the light, having passed through the first polarizer 31, does not leave the first polarizer 31 in parallel rays. The non-parallel light is focused by the molded lens 11 at a point which is not located at the end of the optical fiber 13. Thus light in the reverse direction is not passed back into the optical fiber 13 of the input port 10.

A mounting tube 40 has a chamber (not labeled) for accommodating and fixing the input and output ports 10, 20 and the optical isolating means 30. Soldering holes 401 are defined between an outside surface (not labeled) of the mounting tube 40 and the chamber (not labeled) of the mounting tube 40, for soldering the input port 10, the output port 20, and the isolating means 30 to an inside of the mounting tube 40.

It is to be understood, however, that even though numerous characteristics and advantages of the present invention have been set forth in the foregoing description, together with details of the structure and function of the invention, the disclosure is illustrative only, and changes may be in detail, especially in matters of shape, size, and arrangement of parts within the principles of the invention to the full extent indicated by the broad general meaning of the terms in which the appended claims are expressed.

What is claimed is:

1. An optical isolator comprising:

an input port and an output port, each port comprising an optical fiber for transmitting light beams, a ferrule for fixing and holding the optical fiber, and a molded lens located adjacent the ferrule and the optical fiber for collimating the light beams coming from the optical fiber and focusing the light beams going to the optical fiber; and an optical isolating means disposed in an optical path of an optical signal from the input port to the output port, for transmitting optical signals in an input direction and blocking reflection of optical signals in the reverse direction.

2. The optical isolator as described in claim 1, wherein each molded lens has a uniform refractive index and defines a rearward face and a forward face.

3. The optical isolator as described in claim 2, wherein the forward face defines an aspherical surface.

4. The optical isolator as described in claim 2, wherein the rearward face and the forward face are both coated with an antireflective coating.

5. The optical isolator as described in claim 1, wherein each ferrule has a forward face flush with the optical fiber.

6. The optical isolator as described in claim 5, wherein the rearward face of each molded lens is arranged adjacent the forward face of the corresponding ferrule and said forward and rearward faces are parallel to each other.

7. The optical isolator as described in claim 6, wherein the forward face of the ferrule and the rearward face of the molded lens each form an oblique angle with an imaginary plane constructed perpendicular to a longitudinal axis of the ferrule and the molded lens, respectively.

8. The optical isolator as described in claim 7, wherein the angle is in the range from 6 to 8 degrees.

9. The optical isolator as described in claim 8, wherein the angle of the rearward face of the molded lens is equal to the angle of the forward face of the ferrule.

10. The optical isolator as described in claim 5, wherein a focal point of each molded lens is located at a point where the optical fiber intersects with the forward face of the ferrule.

11. The optical isolator as described in claim 1, wherein each port further comprise a sleeve for receiving the corresponding ferrule and molded lens therein.

12. The optical isolator as described in claim 1, wherein the isolating means comprises a first polarizer, a second polarizer and a Faraday rotator disposed in the paths of the beams from the first polarizer to the second polarizer.

13. An optical isolator comprising:

an input port and an output port facing opposite to each other;

at least one of said input port and said output port including a ferrule and a molded lens enclosed in a sleeve, said molded lens defining a convex forward face; and an isolating means disposed between said input port and said output port;

wherein said isolating means is securely spaced from the convex forward face by another sleeve of said at least one of said input port and said output port.

14. An optical isolator comprising:

an input port and an output port facing opposite to each other;

each of said input port and said output port including a ferrule and a molded lens enclosed in a sleeve, said molded lens defining a convex forward face; and an isolating means spatially disposed between the convex forward faces of the molded lenses of said input port and said output port; wherein said isolating means is secured to at least one of said input port and said output port.

* * * * *